March 31, 1936.  E. M. CUMMINGS  2,035,946

MEANS FOR CUTTING FILM SHEETS SUCH AS PHENOL RESIN

Filed April 16, 1935  3 Sheets-Sheet 1

Inventor,
Edward M. Cummings.
By
Minturn & Minturn,
Attorneys.

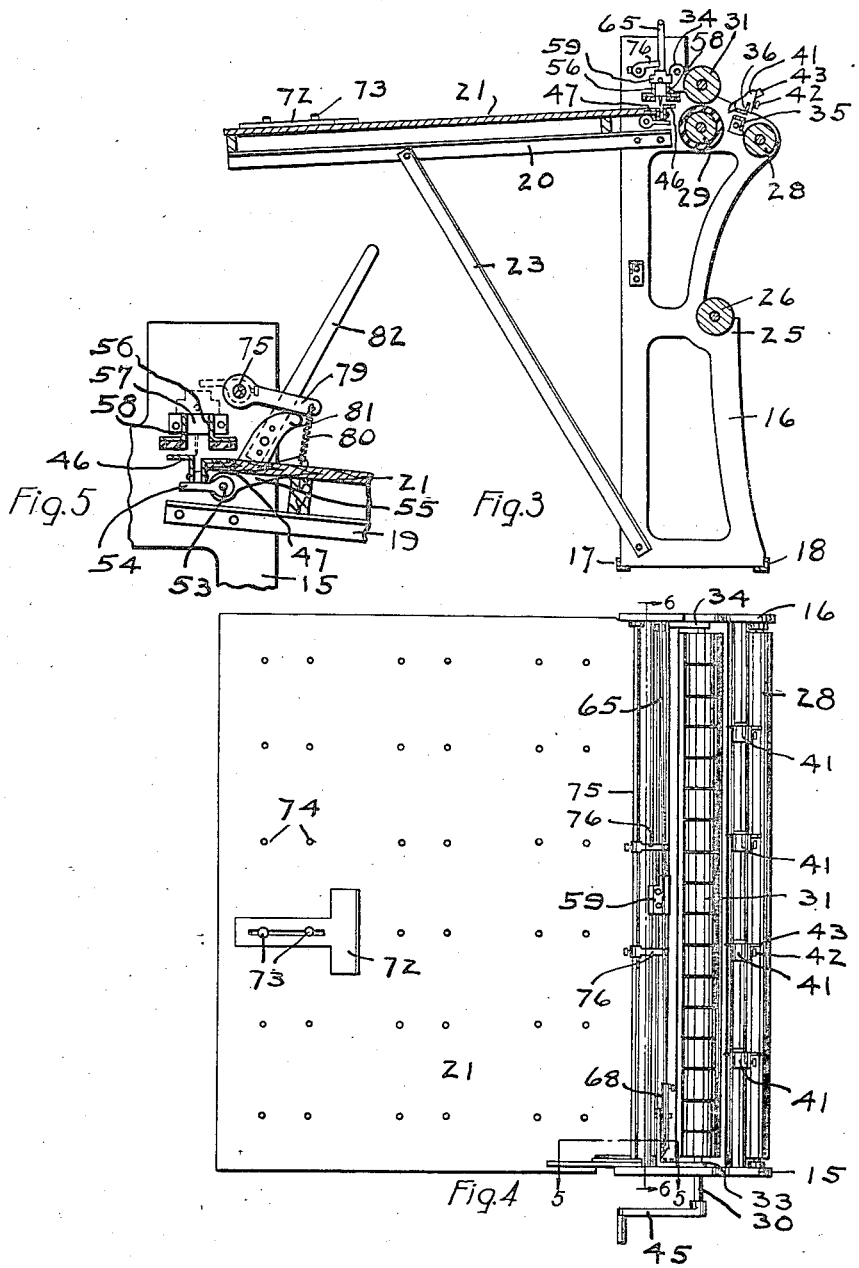

March 31, 1936.  E. M. CUMMINGS  2,035,946
MEANS FOR CUTTING FILM SHEETS SUCH AS PHENOL RESIN
Filed April 16, 1935  3 Sheets-Sheet 3
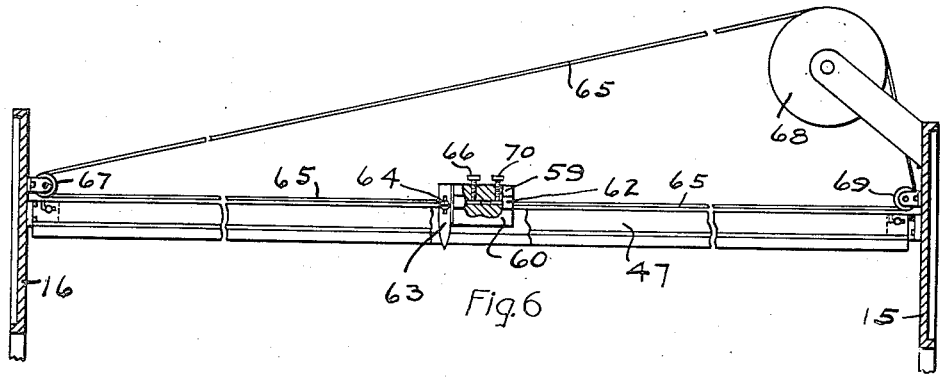
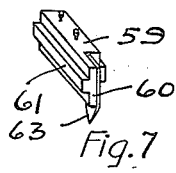
Fig.7
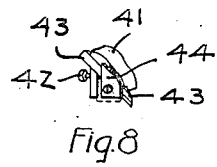
Fig.8
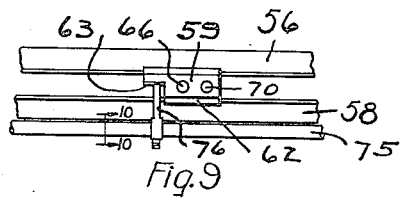
Fig.9
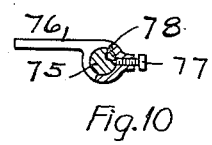
Fig.10
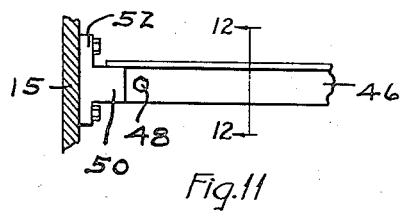
Fig.11
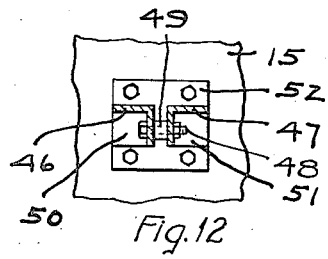
Fig.12
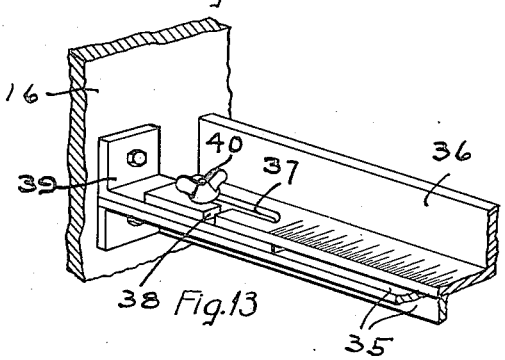
Fig.13
Inventor,
Edward M. Cummings.
By
Minturn & Minturn,
Attorneys.

Patented Mar. 31, 1936

2,035,946

UNITED STATES PATENT OFFICE 2,035,946

MEANS FOR CUTTING FILM SHEETS SUCH AS PHENOL RESIN

Edward M. Cummings, New Albany, Ind.

Application April 16, 1935, Serial No. 16,631

6 Claims. (Cl. 164—73)

This invention relates to apparatus for cutting longitudinally and transversely sheets of glue and a primary object is to provide for such cutting in a manner that is easily controlled in order to prevent waste of the glue material.

In modern practice, particularly in veneer plants, the glue instead of being applied between the various plies in a liquid or paste state is now prepared in a dried sheet form obtainable in rolls. The sheet glue is somewhat brittle and unless carefully handled will crack and break where not desired. In handling such sheet glue, it is the practice to cut areas from the larger sheet to the dimensions of the veneer plies so that the cut area may be laid between the plies and conformed to their dimensions closely without waste.

Heretofore these areas have been cut by hand and in so doing, the areas have not been cut with the greatest of saving due to the nature of the glue as above indicated and also due to the labor involved which essentially was a hand operation requiring some little time as well as skill.

In my invention herein shown and described, I provide apparatus which will carry the roll of sheet glue and permit that sheet to be fed from the roll to be slit in longitudinal panels and then to be cut transversely either entirely thereacross including all of the panels or only selected panels so that any desired length and width of an area of the sheet may be cut. The operations are carried out by my apparatus in such a manner that there is no tendency for the glue to crack or split and extreme accuracy is achieved with the resulting saving in the material.

Another important advantage of my invention is that the cost of the apparatus for so handling the glue is relatively low and all of the operations are performed in plain view of the operator with the greatest of convenience.

Figure 1:
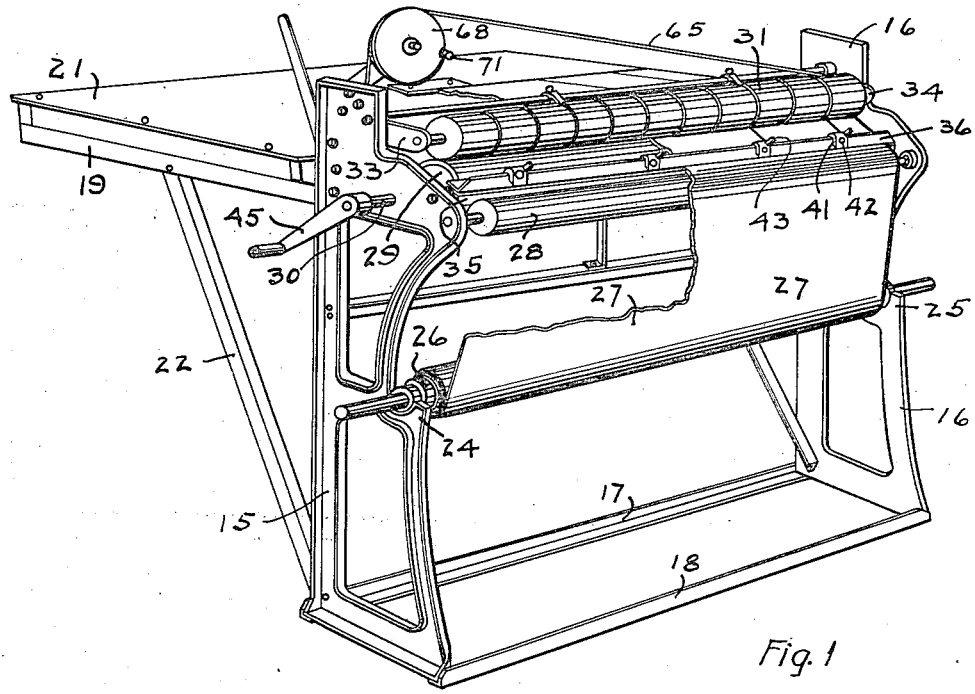
Figure 2:
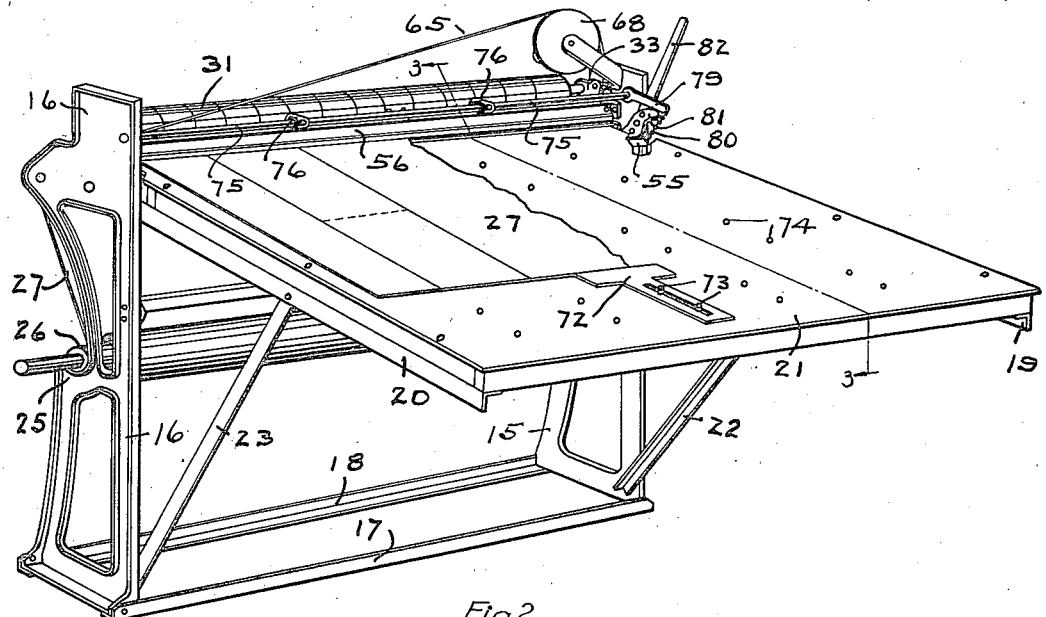

Other objects and advantages of the invention will become apparent to those having knowledge of the art in the following description of my invention as more or less diagrammatically illustrated in one preferred form in the accompanying drawings, wherein Fig. 1 is a front perspective view of an apparatus embodying my invention;

Fig. 2, a perspective rear view;

Fig. 3, a vertical longitudinal section through the apparatus on the line 3—3 in Fig. 2;

Fig. 4, a top plan view;

Fig. 5, a detail in vertical section on the line 5—5 in Fig. 4;

Fig. 6, a transverse section on the line 6—6 in Fig. 4;

Fig. 7, a perspective end view of the cross cutting head;

Fig. 8, a perspective end view of one of the slitting knife heads;

Fig. 9, a detail in top plan view of a cross head stop;

Fig. 10, a transverse section through the stop carrying shaft;

Fig. 11, a detail in vertical elevation of the lower pressure bar support;

Fig. 12, a vertical transverse section on the line 12—12 in Fig. 11;

Fig. 13, a detail in perspective of the mounting of the slitter bar end.

Like characters of reference indicate like parts throughout the several views in the drawings.

A pair of end standards 15 and 16 are preferably tied together at their lower ends by the ties 17 and 18, here shown as angle bars. From the rear sides of these standards 15 and 16 toward their upper ends extend the table carrying bars 19 and 20 over and on which is carried the table 21. The bars 19 and 20 are inclined downwardly somewhat below the horizontal plane and are there secured by means of the braces 22 and 23.

The standards 15 and 16 each carry a knee 24 and 25 respectively having an upper recess forming a bearing in each instance for the ends of a roller 26. This roller 26 is adapted to carry the roll of sheet glue 27, Fig. 1, and is free to turn with the glue as the glue may be pulled from the roller. It is preferred that there be sufficient friction in the end bearings of the roller 26 so as to prevent spinning of the glue roll as it may be withdrawn.

Both end frames 15 and 16 are also symmetrically formed to each have a forward upper extending portion to carry therebetween an idler roller 28, this roller being preferably carried in ball bearings so as to reduce friction to a minimum. Now immediately rearwardly of the idler roller 28 and preferably at a slightly higher elevation, is revolubly placed a feed roll 29, the roll being supported by the end frames 15 and 16 and having a central shaft 30 extending on through one of the frames, here shown as through the frame 15, Fig. 1. This roll 29 is preferably formed to have a circumferential layer of resilient material such as rubber.

Immediately above the feed roller 29 is placed a pressure roller 31 made up of a plurality of sections all carried on a shaft 32 which is in turn carried by the end brackets 33 and 34 rockably attached by their rear ends to the frames 15 and 16 so that the roller 31 may rest normally against the roller 29. The roller 31 is made in the sectional form so that as near an even pressure as possible may be exerted by the roller against the under roller 29 throughout its length.

The rollers 28 and 29 are spaced sufficiently apart to permit the carrying therebetween of a slitter mechanism. An angle bar 35 is fixed by its ends between the frames 15 and 16 to have one leg downturned between the rollers 28 and 29 and the other leg directed upwardly and rearwardly to have its upper surface substantially in the plane tangent to both the rollers 28 and 29. Another angle bar 36 is placed immediately above the angle bar 35 in parallel relation thereto to have one leg directed upwardly and rearwardly and the other leg turned upwardly so as to leave a space between the rearwardly turned legs of the two bars. While the lower bar 35 is mounted in fixed relation to the end frames 15 and 16, the upper bar 36 normally carried in fixed relation between the end frames is releasably secured therebetween as a matter of convenience. The rearwardly turned leg of the bar 36 is at each end preferably slotted, Fig. 13, to have a longitudinal slot 37 with a transverse slot 38 entering therein from the edge of the leg. A bracket 39 secured to the end frame 16 is inserted by a portion thereof under the angle bar 36 and carries a bolt 40 which passes down through the slot 37 to screwthreadedly engage the bracket 39. Thus by loosening the bolt 40, the angle bar 36 may be shifted longitudinally for adjustment and also shifted to permit the slot 38 to register with the bolt 40 and thus to permit the angle bar to be removed entirely.

On this angle bar 36 is carried the desired number of slitter knife heads 41, here shown as four in number, although this number may be varied at will depending upon the width of the glue to be cut. Each of these heads 41 is formed to rest on the rear turned leg of the bar 36 and is further formed to have a slot to receive thereacross the upturned leg of the bar. A set screw 42 screwthreadedly passes through the front of the head 41 to engage against the front side of the upturned leg of the bar 36 as a means for securing the head in the desired position along the bar. The head in each instance is formed to carry a knife 43 diagonally along one side and has a clamp plate 44 to compressively engage the knife against the side of the head so that the knife may be held in the desired adjustment. The cutting edge of the knife is directed downwardly and rearwardly over the rear edge of the rear turned leg of the bar 36, Fig. 3.

Now assuming the glue 27, Fig. 1 to be on the roll 26, the free end of this sheet of glue is carried upwardly and over the roller 28. The bar 36 is removed and the sheet 27 is laid over the bar 35. The roller 31 is lifted and the sheet 27 is laid over the roller 29 under the roller 31. The roller 31 is dropped to compressively urge the sheet against the feed roller 29 and the bar 36 is restored to its position and the cutting edges of the knives 43 are adjusted to positions across the sheet 27 as checked by graduations thereon. Adjustment of the entire bar in initially had by moving the bar 36 longitudinally on the brackets 39 to have the graduations start from the sheet edge, following which the bolts 40 are tied down as above indicated. Now by turning the shaft 30 by any suitable means such as by the crank 45, Fig. 1, the glue is pulled between the rollers 29 and 31 to cause the sheet 27 to be slit into longitudinal panels as it is carried past the downwardly extending knives 43. The mechanism thus far described provides simply for cutting these longitudinal panels and further means will now be described for cutting the panels transversely.

Immediately to the rear of the roller 29 in slightly spaced relation therefrom are mounted a pair of angle bars 46 and 47 to be vertically reciprocable. These two bars 46 and 47 are so disposed in relation to each other as to have downturned legs in parallel spaced relation with the other legs outwardly disposed in opposite directions. The two bars 46 and 47 are tied together by means of bolts 48, Figs. 11 and 12, passing through suitable spacers 49 to provide for the desired spacing apart of the bars. The bars thus tied together form in effect a single unit wherein each bar is fixed in relation to the other. Preferably the bar 47 which is the one back of the bar 46 has its upper rearwardly disposed leg at a lower elevation than the upper side of the bar 47 and is further carried to lap over the forward end of the table 21, although not necessarily so.

This unit comprising the bars 46 and 47 is carried between the end frames 15 and 16 to have the downturned legs of the two bars slidably extending between the feet 50 and 51, Fig. 12, of a bracket 52 on each frame, Figs. 11 and 12. The upper horizontally disposed legs of the bars 46 and 47 normally rest on the upper sides of the feet 50 and 51 so as to limit the downward travel of the bars. Below and to the rear of the bars 46 and 47 is mounted a transverse shaft 53 carried by its ends by the end frames 15 and 16. Mounted on this shaft 53 are two or more arms 54 normally forwardly directed immediately under the bars 46 and 47 so that upon turning of the shaft 53, the arms 54 may push upwardly on the bars 46 and 47 so as to lift them accordingly. An operating arm 55, Fig. 5, is fixed to the shaft 53 to extend rearwardly therefrom along the frame 15 as a means for rocking the shaft 53.

Immediately above the angle bar 46 is positioned an angle bar 56 held in fixed position between the end frames 15 and 16 by being attached to a bracket 57 on each frame. Also above the angle bar 47 is an angle bar 58 likewise held in fixed position between the end frames 15 and 16 by those same brackets 57, the brackets also serving as means for spacing apart the vertically upturned legs of the bars 56 and 58. The other legs of the respective bars 56 and 58 are turned in opposite directions from each other as indicated in Fig. 5. The under sides of these horizontally disposed legs of the bars 56 and 58 are provided with resilient cushions such as rubber. By rocking the shaft 53 through the lever 55, the arms 54 may lift the lower bars 46 and 47 to bring them into compressive engagement with the cushions on the under sides of the upper bars 56 and 58.

A cross head 59 is formed to have a central body portion 60 which drops between the upturned legs of the bars 56 and 58 so as to be free to slidably travel therebetween longitudinally of the bars. Shoulders 61 and 62 are provided on the respective opposite sides of the head 59 to rest on the upper edges of the upturned legs of the bars 56 and 58 to keep the head from dropping on through between the bars. One end of the head 59 is offset to receive a knife 63 which is preferably slotted for vertical adjustment to receive a bolt 64 therethrough screwthreadedly engaging the head 59 so as to provide for vertical adjustment of the knife 63. The knife is so proportioned as to permit its lower sharpened end to extend normally slightly below the under sides of the rubber cushions under the bars 56 and 58. The knife has a cutting edge on both sides so as to cut in either direction of travel.

The head 59 is caused to travel back and forth along the bars 56 and 58 by means of a cable 65 which has one end inserted in a hole in the head 59 and there secured by a set screw 66 and then carried along above the bars 56 and 58 around a pulley 67 mounted on the end frame 16 and thence upwardly and over a driving pulley 68 down around a pulley 69 mounted on the end frame 15 and thence back over the bars 56 and 58 to have the other end entered in a hole in the head 59 and there secured by a set screw 70. A crank 71, Fig. 1, on the pulley 68 serves as a means to turn the pulley 68 and thus cause travel of the head 59.

When the roller 29 is turned by the crank 45, the glue is fed over the bars 46 and 47 onto the table 21, coming thereon in the longitudinally slit form as indicated in Fig. 2. Preferably some form of a stop is provided where predetermined lengths of those panels are desired to be cut. In the form herein shown, I provide a stop 72, Figs. 4 and 2, which may be selectively located over the table 21 by passing pins 73 down through a slot in a stop 72 into suitable holes 74 in the table 21. Now to cut the lengths of the panels as desired, the glue is stopped and the pulley 68 is turned to carry the head 59 across the panels to have the knife 63 cut transversely across the glue. However, before this cutting operation may be performed, it is necessary to lower the lever 55 so as to press the bars 46 and 47 up firmly against the bars 56 and 58 so as to hold the glue snugly so as to prevent wrinkling or distortion of the glue as the knife 63 is carried thereacross. In this regard it is necessary to properly space apart the bars 56 and 58 so that they will suitably grip the glue without too wide a space therebetween and yet permit the knife 63 to travel therebetween. The lever 55 is held down so that the knife 63 may travel entirely thereacross if that is the desired operation. However where it is desired to cut only part of those panels transversely, I provide an upper rod 75 secured by its ends in the respective frames 15 and 16. This rod 75 is located to the rear of the roller 31 and has fixed thereon one or more fingers 76. These fingers are so formed, Fig. 10, as to be adjustably secured along the rod at selected positions. The fingers are here shown as being threaded on the rod and have set screws 77 screwthreadedly passing therethrough and engaging in a V-notch 78 formed along a side of the rod. The lengths of these fingers 76 are made to be such that by rocking the rod 75, the fingers may be dropped into the path of the cross head 59 so as to have the ends of the fingers enter the offset portion of the head 59 as indicated in Fig. 9 whereby the knife cutting edge will then be stopped immediately below the side of that finger which has stopped the head. Of course, by rocking the rod in the reverse direction the finger will be removed from the path of the head 59 so as to permit further travel of the head.

Now in order to control the stop fingers 76, I fix an arm 79 to the rod 75 and extend the arm 79 rearwardly over the arm or lever 55. I tie the outer ends of these arms 79 and 55 together by a spring 80 and interpose a cam 81 between the two arms. This cam 81 is carried on a lever 82 attached to the frame 15. The cam 81 is so shaped as to contact by its upper and lower ends the arms 55 and 79 so that by pulling the lever 82 forwardly the two arms will tend to be separated whereby pushing the lever 82 rearwardly will permit the spring 80 to pull the two arms toward each other.

The cam 81 is further shaped at both ends so that when the lever 82 is pulled forwardly, during a part of that movement, the lower end of the cam will shift the arm 55 downwardly without causing any material motion of the arm 79. Thus in order to cut entirely across the glue sheet 27, the lever 82 may be pulled to this forward position and then stopped. This operation permits the glue to be cut without interference from the stops 76 and allows the crosshead 59 to pass under the stops. However, if only a portion of the width is to be cut, the lever 82 is pulled on to its forward limit of travel thereby also pushing upwardly on the arm 79 and thereby bringing the stop or stops 76 into the path of the crosshead 59 thereby limiting the cutting travel. The stop 76 may be set of course, to cut any one or more of the panels as defined by the slitting knives 43.

While I have herein shown and described my invention in the one best form as now known to me, it is obvious that structural variations may be had without departing from the spirit of the invention and I, therefore, do not desire to be limited to that precise form beyond the limitations as may be imposed by the following claims.

I claim:

1. A machine for cutting sheet glue into definite areas comprising in combination sheet glue feeding means, a member over which the sheet is drawn, one or more sitting knives between said means and said member in the path of said sheet, a clamp bar past which said sheet is fed, a shiftable bar formed to be moved to press the glue against the clamp bar, a crosshead carried by one of the bars to travel therealong, a knife on the crosshead extending into the path of the glue close to said bars, and means for shifting the crosshead.

2. The combination of sheet glue feeding means, a reciprocating member over which the glue sheet is passed, a clamp bar unit against which said member may compress the sheet, a crosshead on the member slidable therealong, said unit being longitudinally slotted, a knife on the crosshead extending through said slot into the path of said sheet, one or more stops mounted to be moved into and out of the path of said crosshead, means for reciprocating said member, means for moving said stops, and means selectively actuating said reciprocating and moving means whereby said sheet may be clamped in position to permit cutting entirely thereacross or only part way as limited by said stops.

3. The combination of sheet glue feeding means, a reciprocating member over which the glue sheet is passed, a clamp bar unit against which said member may compress the sheet, a crosshead on the member slidable therealong, said unit being longitudinally slotted, a knife on the crosshead extending through said slot into the path of said sheet, one or more stops mounted to be moved into and out of the path of said crosshead, means for reciprocating said member, means for moving said stops, and means selectively actuating said reciprocating and moving means whereby said sheet may be clamped in position to permit cutting entirely thereacross or only part way as limited by said stops, a roller adapted to carry a roll of said sheet glue from which roll said feeding means may pull said sheet, and one or more slitting knives interposed between said roller and said feeding means for cutting the sheet longitudinally into panels.

4. A sheet glue cutting machine comprising a glue carrier roller, a pair of spaced apart bars between which the glue sheet is passed, one or more slitter knives carried by one of said bars and directed into the path of the sheet, sheet feed rollers adapted to pull the sheet past said knives, a table onto which the sheet is fed from said feed rollers, a clamp member adjacent said feed rollers under which the sheet is passed, a reciprocating unit under the clamp member over which the sheet is passed, both said clamp member and said unit being longitudinally slotted, a crosshead shiftable along the clamp member slot, a knife on the crosshead extending through the slot, and means for pressing the clamp member and unit one toward the other to grip said sheet therebetween.

5. In a machine for cutting sheet glue, a transverse cutting mechanism comprising a slotted clamp member, a second slotted clamping member reciprocable toward the first member, a crosshead on the first member, a knife on the crosshead extending toward the second member, a rod along the first member, one or more stops on the rod formed to be carried by the rod into the path of the crosshead, an arm arranged to push the second member toward the first, and a cam arranged to initially rock said arm to cause a pressing together of said members, and upon further movement, to retain together said members and move said stop or stops into the crosshead path.

6. In a machine for cutting sheet glue, a transverse cutting mechanism comprising a slotted clamp member, a second slotted clamping member reciprocable toward the first member, a crosshead on the first member, a knife on the crosshead extending toward the second member, a rod along the first member, one or more stops on the rod formed to be carried by the rod into the path of the crosshead, an arm arranged to push the second member toward the first, and a cam arranged to initially rock said arm to cause a pressing together of said members, and upon further movement, to retain together said members and move said stop or stops into the crosshead path, and a cable for shifting said crosshead to cause said knife to cut across a glue sheet that may be clamped between said two members.

EDWARD M. CUMMINGS.